United States Patent [19]

Pribble et al.

[11] Patent Number: 5,669,338

[45] Date of Patent: Sep. 23, 1997

[54] DUAL CIRCUIT COOLING SYSTEMS

[75] Inventors: Robert L. Pribble; Gregg W. Uhland; Brian R. Weller, all of Lafayette, Ind.

[73] Assignee: Caterpillar Inc., Peoria, Ill.

[21] Appl. No.: 632,045

[22] Filed: Apr. 15, 1996

[51] Int. Cl.[6] ............................................. F01P 3/00
[52] U.S. Cl. ........................... 123/41.29; 123/41.31; 123/563; 60/599
[58] Field of Search .................... 123/41.31, 41.29, 123/563, 41.1; 60/599

[56] References Cited

U.S. PATENT DOCUMENTS

| | | | |
|---|---|---|---|
| 3,752,132 | 8/1973 | Bentz et al. | 123/119 |
| 3,946,943 | 3/1976 | Hattori | 123/41.1 |
| 4,000,725 | 1/1977 | Harris | 123/119 |
| 4,236,492 | 12/1980 | Tholen | 123/119 |
| 4,317,439 | 3/1982 | Emmerling | 123/563 |
| 4,325,219 | 4/1982 | Stang et al. | 60/599 |
| 4,348,991 | 9/1982 | Stang et al. | 123/41.29 |
| 4,520,767 | 6/1985 | Roettgen et al. | 123/41.1 |
| 4,563,983 | 1/1986 | Hayashi et al. | 123/41.21 |
| 4,697,551 | 10/1987 | Larsen et al. | 123/41.31 |
| 4,726,324 | 2/1988 | Itakura | 123/41.1 |
| 4,961,404 | 10/1990 | Itakura et al. | 123/41.31 |
| 5,353,757 | 10/1994 | Susa et al. | 123/41.29 |
| 5,394,854 | 3/1995 | Edmaier et al. | 123/563 |
| 5,415,147 | 5/1995 | Nagle et al. | 123/563 |

*Primary Examiner*—Noah P. Kamen
*Attorney, Agent, or Firm*—Alan J. Hickman

[57] ABSTRACT

This invention relates to a cooling system for a turbocharger engine having a first and a second fluid passing cooling circuits connected to a common radiator at spaced apart locations on the radiator. The first fluid passing cooling circuit circulates cooling fluid flow between the radiator and the engine and the second fluid passing cooling circuit circulates cooling fluid between an aftercooler and the engine. A temperature controlled valve in the first fluid passing circuit increases the cooling capacity of the second fluid passing circuit when closed or partially closed.

2 Claims, 1 Drawing Sheet

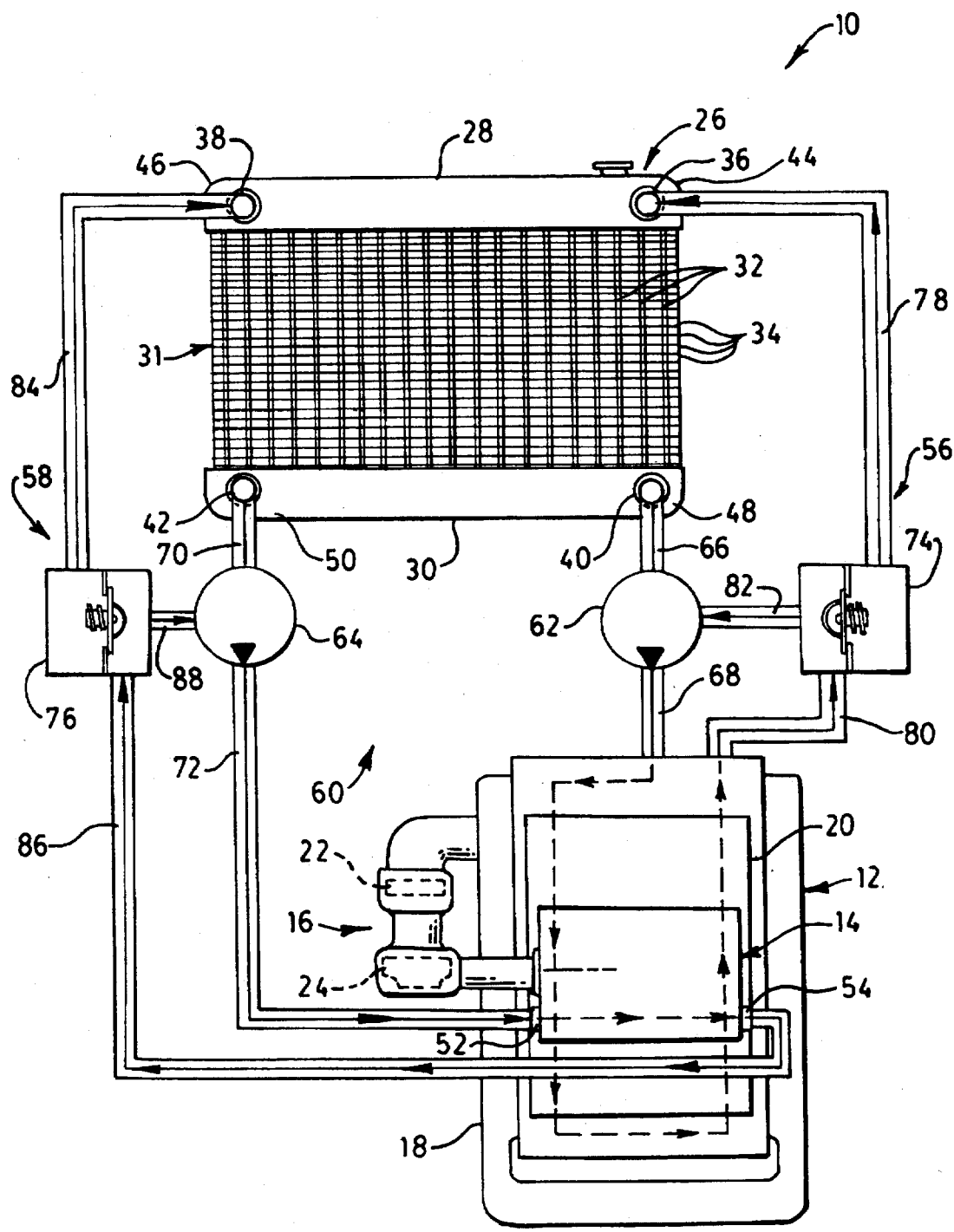

DUAL CIRCUIT COOLING SYSTEMS

TECHNICAL FIELD

This invention relates to a cooling system having first and second fluid passing cooling circuits and more particularly to a cooling system having a first fluid passing engine cooling circuit and a second fluid passing aftercooler cooling circuit sharing a common radiator.

BACKGROUND ART

Cooling systems for an internal combustion engine with a turbocharger aftercooler typically has multiple heat removing devices, one or more radiators for cooling the engine jacket cooling fluid, and a separate heat exchanger for cooling the inlet compressed air being directed to the engine intake manifold. This may be an effective way to cool the engine jacket cooling fluid and inlet air, however, it is complex in design and costly to provide.

Cooling systems of this type are often used in stationary applications, for example electric sets, pumps and the like and in some cases mobile machine applications, for example, earth moving, paving, material handling and the like. These cooling systems tend to be bulky and heavy. In mobile applications, this reduces the horsepower to weight ratio which results in reduced machine work capacity and efficiency. Further, the size of the enclosure required to cover the engine and cooling system is larger than desired and results in a compromised enclosure design. This compromise affects the appearance, aerodynamic characteristics, and performance parameters associated.

Lower engine emissions, lower brake specific fuel consumption and more power is obtained when the cooling fluid to the aftercooler is maintained at the lowest achievable temperature. It is also recognized that the jacket water engine cooling fluid temperature should be maintained at a target temperature of a different magnitude than the lowest achievable temperature of the aftercooler cooling fluid. Due to the differences in the temperature requirements, prior cooling systems have not been able to economically maintain satisfactory engine coolant temperature and benefit from lower aftercooler cooling temperatures using a common radiator and a common cooling fluid.

The present invention is directed to overcoming one or more of the problems set forth above.

DISCLOSURE OF THE INVENTION

A cooling system for a turbocharger internal combustion engine includes a radiator having upper and lower tanks and a core connected to the upper and lower tanks. The core passes fluid flow between the upper and lower tanks. The upper tank has first and second spaced apart fluid passing inlet ports and the lower tank has first and second spaced apart fluid passing outlet ports. A first fluid passing cooling circuit connects the first inlet port of the radiator to the engine and the first outlet port of the radiator to the engine. The first fluid passing cooling circuit delivers engine jacket cooling fluid from the first outlet port of the radiator to the engine and returns engine heated cooling fluid from the engine to the first inlet port of the radiator. A second fluid passing cooling circuit connects the second inlet port of the radiator to an outlet port of an aftercooler and the second outlet port of the radiator to an inlet port of the aftercooler. The second fluid passing cooling circuit delivers aftercooler cooling fluid from the second outlet port of the radiator to the inlet port of the aftercooler and returns aftercooler heated cooling fluid from the outlet of the aftercooler to the second inlet port of the radiator. A means circulates the cooling fluid in the first and second fluid passing cooling circuits.

BRIEF DESCRIPTION OF THE DRAWINGS

FIG. 1 is a schematic representation of an embodiment of a cooling system for a turbocharged internal combustion engine of the present invention.

BEST MODE FOR CARRYING OUT THE INVENTION

With reference to FIG. 1, a cooling system 10 for cooling the cooling fluid of an internal combustion engine 12 and an aftercooler 14 is disclosed in substantial detail. The cooling system 10 is particularly suited for use in stationary applications, such as electric generators sets and pumps, however, mobile machine applications, such as earth moving, paving, material handling and the like are considered equivalent applications and within the scope of the invention.

The internal combustion engine 12 has a turbocharger 16. The turbocharger 16 is connected to an exhaust manifold 18 and intake manifold 20 of the engine 12. A turbine 22 of the turbocharger 16 is connected to rotate in response to the passing of exhaust gasses. The aftercooler 14 is connected between a compressor 24 of turbocharger 16 and the intake manifold 18. The aftercooler 14 cools compressed air delivered from the compressor 24 to the intake manifold 18. Since turbochargers are well known in the art, further discussion related to the construction and operation thereof will be omitted.

The cooling system 10 has a radiator 26. The radiator 26 has an upper tank 28, a lower tank 30 and a core 31 having a plurality of spaced apart tubes 32 connected to the upper and lower tanks 28,30. The tubes are open to the upper and lower tanks 28,30 which allows fluid flow to pass between the upper and lower tanks 28,30. Cooling fins 34 are connect the tubes 32 and assist in promoting heat transfer between the tubes 32 and the cooling air flow. The upper tank 28 has first and second spaced apart fluid passing inlet ports 36,38 and the lower tank has first and second spaced apart fluid passing outlet ports 40,42. It is to be noted that the radiator 26 is not split or divided in any way and contains a single cooling fluid type.

An axial fan of conventional design (not shown) is disposed between the radiator 26 and engine 12. The fan passes cooling air flow across the radiator to promote accelerated heat transfer between the radiator and the atmosphere. As a result the temperature of the cooling fluid in the radiator is lowered.

The upper tank 28 has first and second end portions 44, 46 and the lower tank 30 has first and second end portions 48,50. The first inlet port 36 is located at and opens into the first end portion 44 of the upper tank 28 and the second inlet port 38 is located at and opens into the second end portion 46 of the upper tank 28. Similarly, the first outlet port 40 is located at the first end portion 48 of the lower tank 30 and the second outlet port 42 is located at the second end portion 50 of the lower tank 30. The separation of the first and second inlet ports 36,38 and the separation of the first and second outlet ports 40,42 promotes separation of cooling fluid passed by the first and second ports 36,40 and 38,42 and promotes a lowering of the temperature of the cooling fluid directed to the aftercooler 14. This is particularly advantageous on a cool day or at part engine load when the cooling fluid from the aftercooler 14 benefits from an additional amount of the cooling capacity of the radiator 26 because thermostat 74 is partially closed.

The aftercooler 14 has a fluid passing inlet port 52 and a fluid passing outlet port 54. The aftercooler 14 has an internal passage (not shown) in communication with the inlet and outlet ports 52,54. Cooling fluid flow passing through the aftercooler 14 from the inlet to the outlet ports 52,54 cools the compressed inlet air directed to the engine intake 20.

A first fluid passing cooling circuit 56 connects the first inlet port 36 of the radiator 26 to the engine 12 and the first outlet port 40 of the radiator to the engine 12. The first fluid passing cooling circuit 56 delivers engine jacket cooling fluid from the first outlet port 40 of the radiator 26 to the engine 12 and returns engine heated cooling fluid from the engine 12 to the first inlet port 36 of the radiator 26.

A second fluid passing cooling circuit 58 connects the second inlet port 38 of the radiator 12 to the outlet port 54 of the aftercooler 14 and the second outlet port 42 of the radiator to the inlet port 52 of the aftercooler 14. The second fluid passing cooling circuit 58 delivering aftercooler cooling fluid from the second outlet port of the radiator 42 to the inlet port 52 of the aftercooler 14 and returning aftercooler heated cooling fluid from the outlet port 54 of the aftercooler 14 to the second inlet port 38 of the radiator 26.

A means 60 is provided for circulating the cooling fluid in the first and second fluid passing cooling circuits 56,58. The means 60 includes, but is not limited to, a first cooling fluid circulating pump 62 and second cooling fluid circulating pump 64. The first and second pumps 62,64 are preferably centrifugal pumps of well known construction. The first pump 62 is connected in the first fluid passing cooling circuit 56 by conduits 66,68 and the second pump 64 is connected in the second fluid passing cooling circuit by conduits 70,72. Conduit 66 connects the first outlet port 40 of the radiator 26 to an inlet port of the first pump 62 and conduit 68 connects an outlet port of the first pump 62 to a cooling fluid jacket of the engine 12. The first cooling fluid circulating pump 62 passes cooling fluid flow from the radiator 26 to the engine 12. Conduit 70 connects the second outlet port 42 of the radiator 26 to an inlet port of the second pump 64 and conduit 72 connects an outlet of the second pump 64 to the inlet 52 of the aftercooler 14. The second cooling fluid circulating pump passing cooling fluid flow from the radiator 26 to the aftercooler 14.

The first fluid passing cooling circuit 56 includes a first temperature responsive valve 74, for example a conventional cooling system thermostat. The first valve 74 has open and closed positions and is movable from the normally closed position to the open position in response to the temperature of the engine cooling fluid being greater than a preselected minimum temperature. The second fluid passing cooling circuit 58 optionally includes a second temperature responsive valve 76, for example a conventional cooling system thermostat. The second valve 76 has closed and open positions and is movable from the closed position to the open position in response to the temperature of the aftercooler cooling fluid being greater than a preselected minimum temperature. The first temperature responsive valve 74 is connected to and between the first inlet port 36 of the radiator 26 by conduit 78 and the engine cooling fluid jacket by conduit 80. The first valve 74 is also connected to the first cooling fluid circulating pump 62 by bypass conduit 82. The second temperature responsive valve 76 is connected to and between the second inlet port 38 of the radiator 26 by conduit 84 and the outlet port 54 of the aftercooler 14 by conduit 86. The second valve 76 is also connected to the second cooling fluid circulating pump 64 by bypass conduit 88. The first temperature responsive valve 74 blocks the passing of cooling fluid flow from the engine 12 to the first inlet port 36 of the radiator 26 at the closed position, passes bypass fluid flow to the first cooling fluid circulating pump 62 at the closed position, and passes fluid flow from the engine 12 to the first inlet port 36 at the open position. The second temperature responsive valve 76 blocks the passing of cooling fluid flow between the aftercooler 14 and the second inlet port 38 of the radiator 26 at the closed position, passes bypass fluid flow to the second cooling fluid circulating pump 64 at the closed position, and passes fluid flow from the aftercooler 14 to the second inlet port 38 at the open position.

Industrial Applicability

With reference to FIG. 1, the cooling system 10, cools the engine 12 and the compressed air delivered from the turbo charger 16 to the inlet manifold 20 using a single radiator 26 and with a common cooling fluid. This is achieved by having the first fluid passing cooling circuit 56 connected to the first inlet and outlet ports 36,40 and the second fluid passing cooling circuit 58 connected to the second inlet and outlet ports 38,42.

At cold engine 12 operating conditions, the cooling fluid flow delivered by pump 62 to the engine 12 is bypassed at the first valve 74 (first valve 74 remains closed) until the temperature of the cooling fluid flow delivered to the engine 12 is heated to the preselected operating temperature. The first valve 74 begins to open at this temperature. When the cooling fluid flow circulated by the first pump 62 is in bypass, substantially the full cooling capacity of the radiator 26 is available for after cooling purposes.

The pump 64 of the second fluid passing cooling circuit 58 circulates the cooling fluid flow from the radiator 26 through the aftercooler 14 and back to the radiator 26. Heat transfer takes place between the radiator 26 and the air resulting in a lower cooling fluid temperature. It is to be emphasized that substantially the full cooling capacity of the radiator 26 is available to cool the cooling fluid flow delivered from the aftercooler 14 to the radiator 26. In applications where the optional second temperature responsive valve 76 is provided, the valve remains closed until the temperature of the cooling fluid flow delivered from the aftercooler 14 is at the target temperature. It is noted that the opening temperature of the second valve 76 is substantially less than that of the first valve 74.

At part engine load or on cool days the first thermostat 74 will be only partially open. In this situation the aftercooler 14 will also have greater cooling capacity as more of the radiator core 31 is available to receive cooling fluid flow from the aftercooler 14, resulting in lower aftercooler coolant temperature.

The radiator 26 is sized such that the cooling capacity is adequate to maintain the engine 12 and compressed air temperatures at a preselected value with the first valve 74 open to pass cooling fluid from the engine 12 to the inlet port 36 of the radiator 26 and the second valve 76 open to pass cooling fluid flow from the aftercooler 14 to the inlet port 38 of the radiator.

Other aspects, objects and advantages of the present invention can be obtained from a study of the drawings disclosure and appended claims.

We claim:

1. A cooling system for a turbocharged internal combustion engine; comprising:

a radiator having upper and lower tanks and a core connected to the upper and lower tanks, said core being open to pass fluid flow between the upper and lower tanks, said upper tank having first and second spaced apart fluid passing inlet ports and said lower tank having first and second spaced apart fluid passing outlet ports;

an aftercooler having a fluid passing inlet port and a fluid passing outlet port;

a first fluid passing cooling circuit connecting the first inlet port of the radiator to the engine and the first outlet port of the radiator to the engine, said first fluid passing cooling circuit delivering engine jacket cooling fluid from the first outlet port of the radiator to the engine and returning engine heated cooling fluid from the engine to the first inlet port of the radiator;

a second fluid passing cooling circuit connecting the second inlet port of the radiator to the outlet port of the aftercooler and the second outlet port of the radiator to the inlet port of the aftercooler, said second fluid passing cooling circuit delivering aftercooler cooling fluid from the second outlet port of the radiator to the inlet port of the aftercooler and returning aftercooler heated cooling fluid from the outlet port of the aftercooler to the second inlet port of the radiator;

a first cooling fluid circulating pump connected in the first fluid passing cooling circuit between the first outlet of the radiator and the engine and being adapted to pass cooling fluid from the radiator to the engine;

a second cooling fluid circulating pump connected between the second outlet of the radiator and the inlet to the aftercooler, said second cooling fluid circulating pump being adapted to pass cooling fluid flow from the radiator to the aftercooler;

a first temperature responsive valve having open and closed positions and being movable from said closed position to said open position in response to the temperature of the engine cooling fluid being greater than a first preselected minimum temperature, said first temperature responsive valve being connected between the first inlet port and the engine and connected to the first cooling fluid circulating pump, said first temperature responsive valve blocking the passing of cooling fluid flow from the engine to the first inlet port of the radiator at the closed position, passing fluid flow to the first cooling fluid circulating pump at the closed position, and passing fluid flow from the engine to the first inlet port at the open position;

a second temperature responsive valve having closed and open positions and being movable from said closed position to said open position in response to the temperature of the engine cooling fluid being greater than a second preselected minimum temperature having a magnitude lower the first preselected minimum temperature, said second temperature responsive valve being connected between the second inlet port of the radiator and the outlet port of the aftercooler and connected to the second cooling fluid circulating pump, said second temperature responsive valve blocking the passing of cooling fluid flow between the aftercooler and the radiator second inlet port at the closed position, passing fluid flow to the second cooling fluid circulating pump at the closed position, and passing fluid flow from the aftercooler to the second inlet port at the open position.

2. A cooling system, as set forth in claim 1, including a turbocharger connected to the aftercooler and an engine intake manifold, said turbocharger delivering compressed air to the intake manifold, said aftercooler having a rate of heat transfer which is a function of a temperature of the cooling fluid, said rate of heat transfer between the aftercooler and compressed air increasing in response to the first temperature responsive valve being at the closed position.

\* \* \* \* \*